J. A. & V. O. CAMPBELL.
FRUIT DISTRIBUTING DEVICE.
APPLICATION FILED FEB. 20, 1917.
1,256,294.
Patented Feb. 12, 1918.
2 SHEETS—SHEET 1.
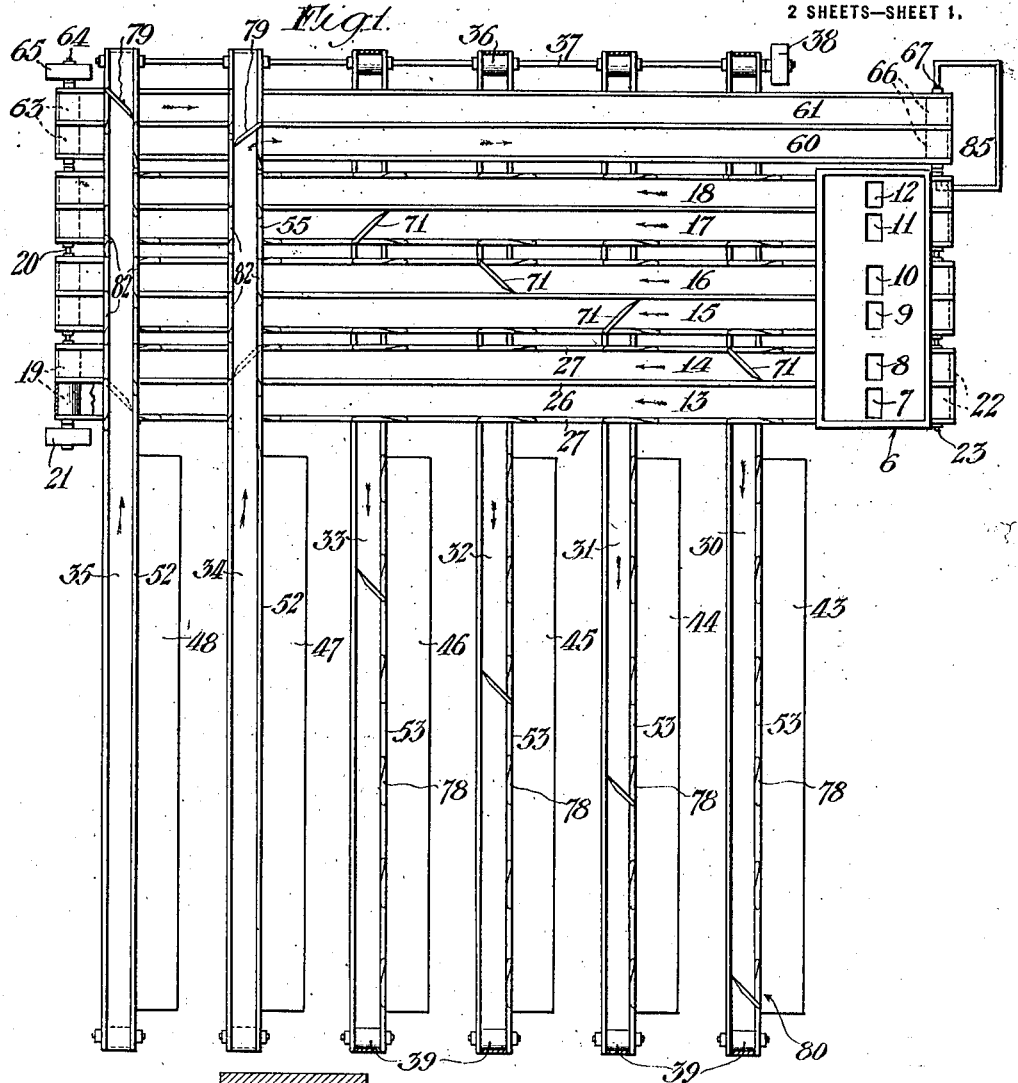
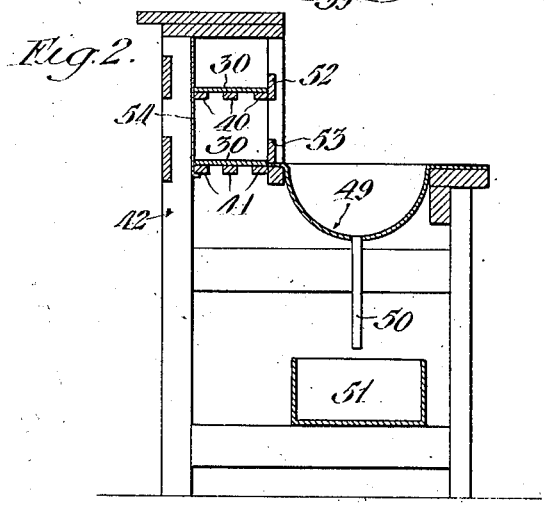

J. A. & V. O. CAMPBELL.
FRUIT DISTRIBUTING DEVICE.
APPLICATION FILED FEB. 20, 1917.
1,256,294.
Patented Feb. 12, 1918.
2 SHEETS—SHEET 2.
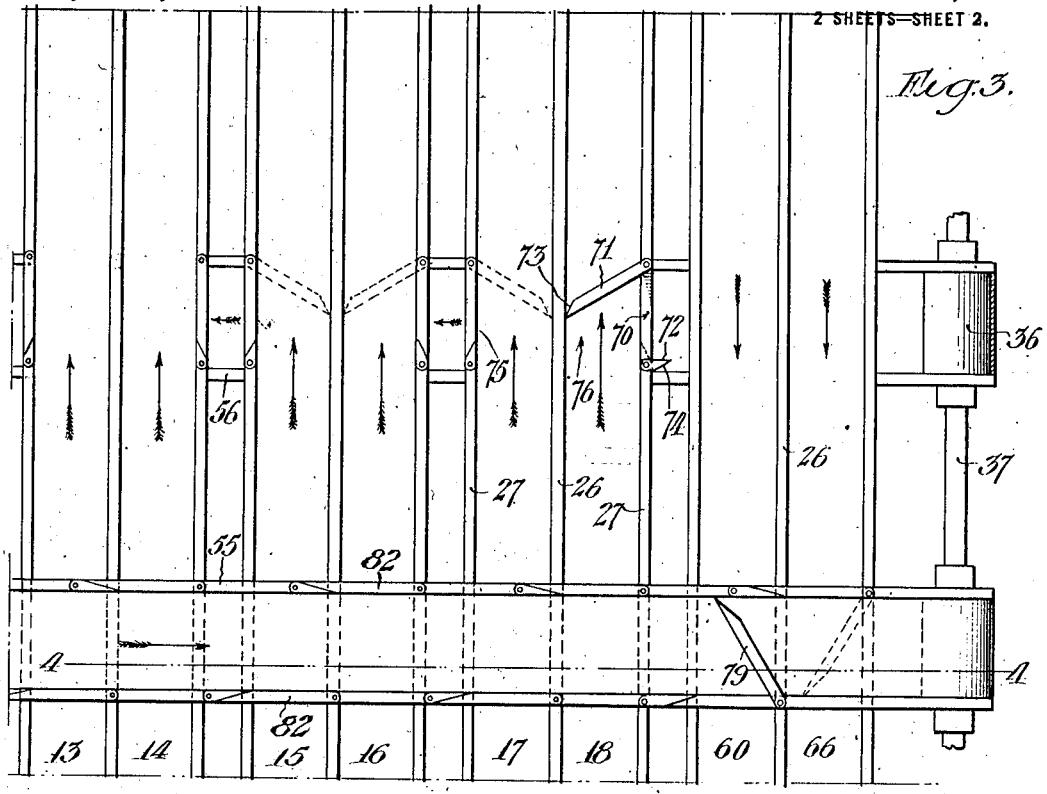
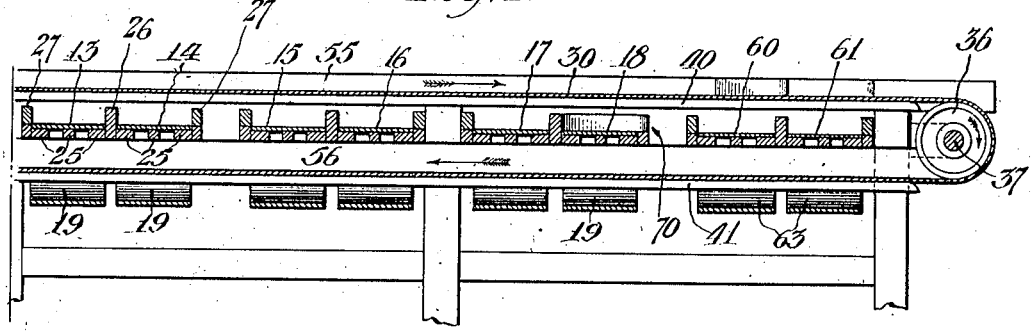
Inventors
Joseph A. Campbell
Vernon O. Campbell
by Graham & Harris
Attorneys

UNITED STATES PATENT OFFICE.

JOSEPH A. CAMPBELL, OF ONTARIO, AND VERNON O. CAMPBELL, OF FRESNO, CALIFORNIA.

FRUIT-DISTRIBUTING DEVICE.

1,256,294.   Specification of Letters Patent.   Patented Feb. 12, 1918.

Application filed February 20, 1917. Serial No. 149,964.

*To all whom it may concern:*

Be it known that we, JOSEPH A. CAMPBELL and VERNON O. CAMPBELL, both citizens of the United States, the former residing at Ontario, in the county of San Bernardino and State of California, and the latter residing at Fresno, in the county of Fresno and State of California, have invented a new and useful Fruit-Distributing Device, of which the following is a specification.

Our invention relates to handling fruit in packing houses, being more particularly a device for conveying and distributing fruit. In packing houses the fruit during the different stages of preparation of the canning process is in many instances placed in the buckets or pans and carried from one part of the house to another between the different operations of preparation. This manner of handling the fruit requires longer time and a greater number of workmen, in general adding considerable expense to the operation of the packing house.

One of the principal objects of our invention is to produce a distributing device of simple form and construction which conveys and distributes the fruit in an economical and efficient manner.

Other objects and advantages will appear hereinafter in the following description of which:

Figure 1 is a diagrammatic plan view of a device embodying a form of our invention.

Fig. 2 is a vertical cross sectional view through a working table and its conveyer.

Fig. 3 is an enlarged plan view of a part of the device shown in Fig. 1, and,

Fig. 4 is a sectional view on line 4—4, Fig. 3.

6 designates a hopper having a series of outlets, 7, 8, 9, 10, 11 and 12 which are arranged to deliver fruit to a series of belts 13, 14, 15, 16, 17 and 18 respectively which travel in the direction of the arrows shown in Fig. 1. These belts are driven by a series of rollers 19, mounted on a shaft 20 driven by means of a pulley 21 from any suitable source of power.

The opposite ends of the belts above referred to are supported upon rollers 22 mounted upon a shaft 23. The shafts 20 and 23 being mounted in any suitable manner upon the frame of the machine.

The upper run of each belt 13, 14, 15, 16, 17 and 18 is supported upon a floor consisting of a series of slats 25, these belts being arranged in pairs separated by division walls 26 and having side walls 27 secured to the respective floors which walls extend above the face of the belt and form guides for the fruit carried on the belts.

30, 31, 32, 33, 34 and 35 designate a series of transversely arranged belts, the lower run of each of which is disposed between the upper and lower runs of the belts 13 to 18 inclusive. The belts 30 to 35 inclusive are driven by means of pulleys 36 on a shaft 37 journaled in any suitable manner upon the frame of the machine, the shaft 37 being driven by means of a pulley 38 from any suitable power source. The outer ends of the respective belts 30 to 35 inclusive are supported on rollers 39 which are likewise journaled in any suitable manner upon the frame of the machine. Both upper and lower runs of the belts 30 to 35 inclusive are supported upon floors 40 and 41 respectively which floors are supported in the frame 42 of the device.

43, 44, 45, 46, 47 and 48 each designate a table arranged in front of the respective belts 30 to 35 inclusive, each table having a trough 49 fitted with a suitable outlet pipe 50 so that the contents thereof may be drained into a receptacle 51 as shown in Fig. 2. Along the front edge of the upper and lower run of each of the belts 30 to 35 inclusive throughout the length of the respective tables is arranged walls 52 and 53 respectively, the back portion of the tables adjacent to the belts being closed by plates or walls 54. That portion of the belts 30 to 35 inclusive which extends through the series of belts 13 to 18 inclusive is provided with a continuation of the walls 52 and 53, and a similar extension is arranged at the back of the respective belts 30 to 35 inclusive as shown at 55 and 56 respectively.

60 and 61 designate a pair of longitudinally extending belts arranged at one side of the series of belts 13 to 18 inclusive and which are likewise arranged with respect to the series of belts 30 to 35 inclusive, that is, the upper run of each belt 30 to 35 inclusive extends over the upper run of the belts 60 and 61, and the lower runs of each belt 30 to 35 inclusive extends above the lower runs of the belts 60 and 61. The belts 60 and 61 are driven by rollers 63 mounted on a shaft 64 which shaft 64 is driven by means of a pulley 65 which receives power from any suitable source, the opposite ends of the belts 60 and 61 being supported on rollers 66 mounted upon a shaft 67 journaled upon the frame of the machine.

Portions of the side walls 27 of the belts 13 to 18 inclusive are cut away as shown at 70 in Fig. 3 each of said openings being provided with a gate 71 and a pivoted block 72. the gates being beveled at one end as indicated at 73, the block being beveled as indicated at 74 so that the gate and block when in closed position form a substantial continuation of the side walls as indicated at 75 in Fig. 3. The gate is indicated in open position at 76 in Fig. 3 in which position the gate 71 is swung around so that its outer end engages the division wall 26 and when fruit upon the belt 18 is conveyed in the direction of the arrow shown thereon in Fig. 3 it will be caught by the gate and delivered through the opening 70 onto the belt 34 thereunder. The construction of the gate with the block as above described is particularly desirable as it will be readily understood that when the gates are in closed position no portion of the gates abut into nor does an edge of the gate extend into the path of the belts associated with the gate.

Similar gates indicated at 78 are provided in the wall 53 of the lower run of each of the belts 30 to 35 inclusive and gates 79 are provided in the walls 55 of the upper run of each of the belts 30 to 35 inclusive. The device is used in the following manner:

Assuming that the device is used for that portion of the packing operation wherein the tables 43 to 48 inclusive are being used by packers for packing fruit in cans, the fruit is dumped into the hopper 6 and is fed through the discharged outlets 7 to 12 inclusive upon the belts 13 to 18 respectively.

The gates 71 in the respective belts 13 to 18 are then set for the distribution of the fruit from the respective belts 13 to 18 inclusive to the belts 30 to 35 inclusive, it being understood that the fruit is distributed from the hopper 6 to the upper run of the belts 13 to 18 inclusive. For instance, the gate 71 of the belt 14 is open and fruit delivered to the belt 14 from the hopper will be swept from the belt 14 by this open gate 71 through the opening 71 in the side wall 27 and dropping therefrom upon the lower run of the belt 30 upon which it is carried in the direction of the arrow shown in Fig. 1 until such fruit comes into contact with an open gate, which when arranged as shown in Fig. 1 is the last gate indicated at 80 which discharges the fruit from the belt 30 upon the table 43 in front of such gate. There is seated a packer in front of each gate 78 at each of the tables 43 to 48 inclusive and as such packer requires more fruit for packing in the cans, such packer opens a gate and permits the gate to remain open until a sufficient quantity of fruit is delivered on the table to keep the packer at work. It is to be noted that one of the gates 71 of the belt 15 is set to deliver the fruit to the lower run of belt 31, and one of the gates of the belt 16 is set to deliver fruit to the lower run of the belt 32, etc.

Usually a particular size of fruit is packed at the tables at one time and usually such fruit is of a particular grade so that in the event the packers find fruit which is unsuitable for the grade being packed, either on account of its size or quality, the packer throws such fruit upon the upper run of the belts 30 to 35 inclusive before which they happen to be at work, such upper run of the belt carrying such fruit in the direction of the arrow shown upon belts 34 and 35 in Fig. 1 to such gate of the respective upper runs of the belts 30 to 35 inclusive as may be open. For instance, one of the gates 79 of the belt 35 is set to discharge fruit from such belt to the belt 61 and one of the gates 79 of the belt 34 is set to discharge the fruit therefrom to the belt 60 as illustrated in Fig. 1, these belts 60 and 61 moving in the direction of the arrows indicated thereon in Fig. 1 and discharging such undesirable fruit to hopper 85 by means of which such fruit may be carried to different parts of the packing house where it may be used for some other purpose such as making jams or similar goods. It will be seen that with a device arranged as above described the system of distributing has a great flexibility and the manner of distributing the fruit from the belts 13 to 18 inclusive to the belts 30 to 35 inclusive may be quickly varied so that the packers have delivered to them instantly fruit as required. Then again, the undesirable fruit is immediately removed from the field of packing and a great amount of time and labor saved, there being no necessity of manual carting of the fruit to the packers or away from the same, but in lieu thereof a continuous supply of fruit to the packers and removal of undesirable fruit as the packing operation goes on. It is to be noted that both runs of each belt 30 to 35 inclusive is utilized as a conveyer and by so doing the same belts may be used for receiving and delivering fruit to other belts moving in the opposite direction in substantially the same plane.

It is to be understood that the belts 13 to 18 inclusive may be extended considerable distance beyond the belt 35 and that the upper runs of the belts 30 to 35 inclusive may be provided with gates whereby fruit or other material carried upon the upper runs of such belts may be redelivered to the upper runs of the belts 13 to 18 inclusive through the medium of the gates 82.

We claim as our invention:—

1. A distributing device comprising, a series of endless conveyers arranged side by side, an endless conveyer arranged substantially at right angles to said series, the lower run of said endless conveyer extending between the upper and lower runs of said series, and means whereby material may be discharged from said series of conveyers to the lower run of said conveyer.

2. A distributing device comprising, a series of endless conveyers arranged side by side, an endless conveyer arranged substantially at right angles to said series, the lower run of said endless conveyer extending between the upper and lower runs of said series, and means whereby material may be discharged from said series of conveyers to the lower run of said conveyer and means whereby material may be discharged from the upper run of said conveyer to any one or all of said series of conveyers.

3. A distributing device comprising a series of endless conveyers arranged side by side, an interposed series of endless conveyers having the lower run of each of such interposed conveyers extending between the upper and lower runs of the conveyers in said first named series, means whereby material may be discharged from any one or all of the conveyers in said first named series to the lower run of any one or all of said interposed conveyers, and means whereby material may be discharged from the upper run of any or all of said interposed conveyers to any one or all of said first named conveyers.

4. A distributing device comprising, a primary series of endless conveyers arranged side by side, means for driving said primary series in one direction, a secondary series arranged at the side of said primary series, means for driving said secondary series in the opposite direction to the primary series, an interposed series of conveyers having the lower runs thereof extending between the upper and lower runs of the primary and secondary series, means whereby material may be delivered from the upper runs of said primary series to the lower runs of said interposed series, means whereby material may be delivered from the upper runs of said interposed series to the upper runs of said primary and secondary series.

5. A distributing device comprising, a series of endless conveyers arranged side by side, an interposed series of endless conveyers having the lower run of each of the conveyers in said interposed series extending between the upper and lower runs of the conveyers in said first named series, means for supporting the upper run of each conveyer in said first named series, means for supporting the upper and lower run of each of the conveyers in said interposed series, side walls arranged at the sides of said supported runs each having a series of openings therein, and a gate for each opening, said gates being arranged to remove the material from its associated conveyer through its associated opening when the gate is in open position.

6. A distributing system comprising a series of endless conveyers, a floor supporting the runs of said conveyers, side walls for said conveyers having a series of openings therein, a gate for each opening, and a pivoted block for each gate, said pivoted block and gate when closed forming a continuation of the side wall and having overlapping beveled edges in engagement with each other.

In testimony whereof we, the said JOSEPH A. CAMPBELL, and the said VERNON O. CAMPBELL, have hereunto set our hands at Los Angeles, California, this 14th day of February, 1917.

JOSEPH A. CAMPBELL.
VERNON O. CAMPBELL.